Dec. 30, 1952   G. C. NEBESAR ET AL   2,623,293
MEANS FOR ACCURATELY CHECKING CONTOURS
Filed Feb. 25, 1949   2 SHEETS—SHEET 2

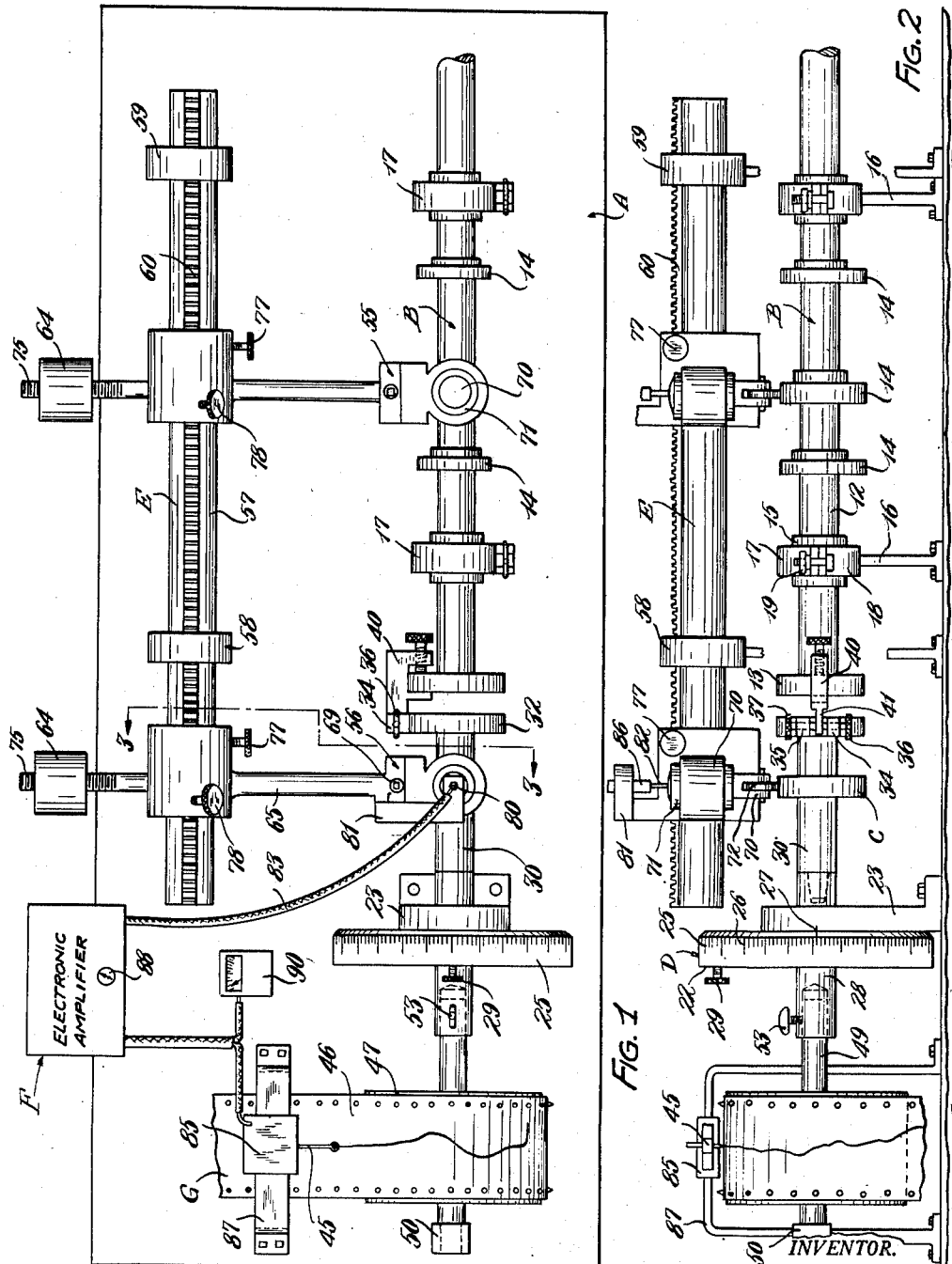

INVENTOR.
GEORGE C. NEBESAR
BY ROBERT N. CUMMER
Alfred C. Body
ATTORNEY

Patented Dec. 30, 1952

2,623,293

UNITED STATES PATENT OFFICE 2,623,293

MEANS FOR ACCURATELY CHECKING CONTOURS

George C. Nebesar and Robert N. Cummer, Cleveland, Ohio, assignors to The Ohio Crankshaft Company, Cleveland, Ohio, a corporation of Ohio Application February 25, 1949, Serial No. 78,272

4 Claims. (Cl. 33—174)

This invention pertains to the art of measurement and, more particularly, to the art of measuring the contours of surfaces which have a substantial variation from either a circle of revolution or a plane.

The invention is particularly adapted, although not limited, to the art of checking cam contours and will be described in relation to apparatus and methods pertaining to such cams, although it will be appreciated that other irregular contours could just as well be checked.

At present, the users of camshafts, particularly those in the large-sized, high-performance, internal-combustion engine equipment, are increasing their specifications on the checking of the contour of the individual cams to the point where a reading, accurate to a ten thousandth of an inch, must be taken every two degrees around the camshaft. If the contour as so measured does not come within certain specified limits, the camshafts are rejected.

The accuracy of measurement required is not difficult to obtain. The problem is one of speed with accuracy. Present practice contemplates positioning the cam in a machine capable of the required accuracy and taking the required number of readings which would be 180 readings per cam if the above specifications are followed. This is an extremely time-consuming operation. At three readings per minute, this is one hour per cam. For a 16-cam camshaft, this requires the equivalent of two full working days. During the time when the camshaft is being checked, it is either necessary for the manufacturer to shut down the machine which made that cam until the checking operation is completed; or to continue running the machine and take the risk that the cam-checking operation will indicate that the machine is operating to satisfactory tolerances; or, in the alternative, produce a lot of scrap camshafts.

There are many possible ways of obtaining accurate measurements on the camshaft but each of them requires an inordinate amount of time. Presumably, some form of recording instrument could be provided but, if the record is to be accurately read, the scale length must have an undue length. For example, if a three-quarter inch rise on a camshaft is required to be checked and a sixty-fourth of an inch is allowed for each ten thousandth of an inch, the resultant scale length will be in excess of nine feet in length, wherein only the differences between the master and the cam under test are measured.

Master cams have been proposed. However, production of a master cam having a contour with an accuracy to a ten thousandth of an inch is almost an impossibility to obtain even using the most accurate laboratory techniques.

The cost of producing each master cam at such accuracy is prohibitive. If a large number of different contoured cams are to be checked, then a single master must be produced for each cam thereby multiplying the cost by the number of cams to be checked. If magnified masters are employed, then temperature differentials become a real problem.

In view of the above, an object of the present invention is the provision of a new and improved apparatus for accurately checking the contour of a surface other than a surface of revolution or a plane surface which is simple in construction, does not require an accurate master, enables the surface to be accurately and rapidly checked and provides a permanent written record of the surface for filing purposes and which is not subject to the difficulties of the prior art.

Another object of the invention is the provision of new and improved apparatus for checking the contours of irregularly shaped surfaces such as cams which provides a high-accuracy scale occupying a minimum of space.

Another object of the invention is the provision of a new and improved apparatus for checking the contour of a cam surface wherein a master cam of the same size as the cam under test may be used and having only a moderate degree of accuracy.

Still another object of the invention is the provision of apparatus for checking the contours of cams wherein the cam being checked is compared to a master cam which may have greater inaccuracies from a perfect cam than the cam being checked.

Still another object of the invention is the provision of a cam checker which provides a highly-accurate, written record of the profile of the cam but on paper having only a normal width.

Still another object is a cam checker having a minimum of moving parts.

Still another object is a cam checker including a master cam, recording drum and camshaft, all having a common aligned axis, thereby eliminating the need for gearing between the various elements.

Still another object is a cam checker including a master cam and recording drum for recording the differences between the master cam and a cam under test, so arranged that all may move as a rigid integral unit and a comparator assembly for comparing the master cam and cam under test including an amplifier means, the entire checker having a minimum of relatively movable parts.

Generally speaking, the invention includes apparatus for comparing the surface under test with a similarly shaped surface having a contour approaching but not necessarily equaling the desired perfect or specified contour, but wherein the variations from the perfect are accurately known. More specifically, the invention comprises moving a master cam of known inaccuracy simultaneously with the cam under test, providing apparatus to accurately compare the two contours and recording on a line graph such differences and subsequently adjusting the differences in contour with the known differences of contour with the master from the perfect.

The invention consists of certain methods and steps and constructions and arrangement of parts, a preferred embodiment of which is described in this specification and illustrated in the attached drawing which is a part hereof, and wherein:

Figure 1 is a top plan view of an apparatus for checking the contours of cams embodying the present invention.

Figure 2 is a side elevational view of the embodiment shown in Figure 1.

Figure 3:
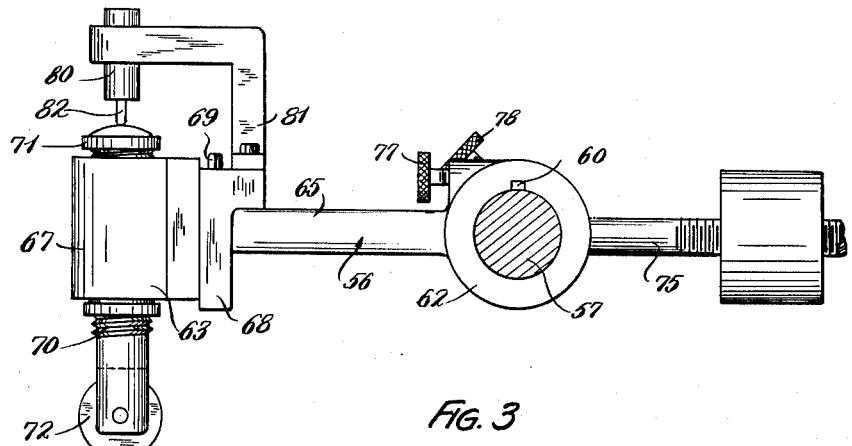
Figure 3 is a sectional view of Figures 1 and 2 taken approximately on the line 3—3 thereof.

Referring now to the drawings wherein preferred embodiments of the invention are shown as applied to apparatus for checking the contours of cams for the purposes of illustration only and not for the purpose of limitation of the invention, Figures 1 and 2 show the apparatus as comprising a base A on which is supported a camshaft B having a plurality of cams to be checked; a master cam C with which the cams of the camshaft B are to be compared; and indexing head D for determining the angular position of the cams; a comparator assembly E forming a linkage between the cam under test and the master cam; an amplifier F for amplifying the minute differences between the two cams and a recording unit G for recording the amplified method variations.

The present apparatus is preferably of the high-precision type capable of making measurements in the order of one hundred thousandths of an inch, and the base A is preferably of a one-piece integral construction sufficiently rigid to support the various units of the apparatus over a considerable period of time without distortion or flection. The base A preferably has an upper surface 11 which is ground or otherwise scraped to a flat and plane surface.

The camshaft B may be of any known conventional type, but the one shown in the drawing comprises an elongated shaft 12 having at the left-hand end a flange 13 and intermediate the ends a plurality of cams 14. Such camshafts also have a plurality of spaced journals 15 which are usually ground and polished to a high degree of accuracy. The camshaft B to be tested is supported for rotation on an axis parallel to the upper surface 11 and adjacent the right front edge of the base A by a pair of spaced bearings or V-shaped blocks 16. These bearings are preferably of the split or openable type comprising an upper half 17 and a lower half 18 so that camshafts may be readily put into the test position and removed therefrom. A clamping screw 19 may be provided for locking the upper and lower halves of the bearings 17 and 18 into position. The bearings are preferably movable along the surface 11 whereby camshafts having journals at different spacings may be readily positioned in the apparatus.

The indexing head D comprises a large circular disk 22 rotatably supported by a shaft 28 having an axis of rotation exactly aligned with the axis of rotation of the camshaft B, the shaft 28 being journaled in a bracket 23 fixed to the upper surface 11 of the base A. The outer periphery of the index disk 22 preferably has graduations 25 in degrees numbering from 0 to 360. The bracket 23 includes a disk-like member 26 extending out substantially flush with the end of the disk 22 on which are provided an index mark 27 and vernier graduations as is conventional practice in equipment of this type. The disk 22 is itself adjustably fixed relative to the shaft 28. A handle 29 is provided for clamping the disk 22 relative to the shaft 28 when a desired adjustment has been made.

The master cam C generally includes a supporting shaft 30 aligned with the camshaft 13, the left-hand end of which shaft 30 is rigidly fixed to the right-hand end of the shaft 28. In the embodiment shown, a locking-taper arrangement is provided. Any other means of mounting the shaft 30 relative to the shaft 28 may be provided. The right-hand end of the shaft 30 preferably has a flange 32 of substantially the same diameter as the flange 13 on the camshaft B to be tested. The position of the bearing supports 16 are preferably such that the two flanges are positioned in opposed but slightly-spaced relationship.

Mechanism is provided on the flange 32 by means of which the master cam C and the cam 14 under test may be accurately aligned angularly relative to each other. In the embodiment shown, this mechanism comprises a pair of upstanding spaced lugs 34, 35 on the flange 32 with opposed surfaces spaced and substantially parallel. Micrometer screw members 36, 37 are threadably supported in these lugs in aligned relationship and extend into the space between the two lugs.

A clamping member 40 clamps to the sides of the flange 13 and has an arm 41 which extends between the ends of the micrometer screws 36, 37. It will be appreciated that by suitably adjusting the micrometer screws 36, 37, a very fine angular adjustment may be secured between the master cam C and the cams 14.

In manufacturing camshafts 14, the dimensions of the normal or perfect cam contour to which the cams should be made is normally specified and, in normal production work, certain tolerances on either side of this ideal contour are generally specified.

The master cam C is termed a master cam for the purposes of convenience only. It need not be any closer in contour to the ideal cam than the contour of the cam 14. In fact, it may vary from the contour of the ideal cam to a greater amount than the contour of the cam 14. It is preferred, however, that its contour does not vary over two thousandths of an inch from that of the ideal cam. Such variation is within capabilities of even mediocre machine tools. Even with such variations, it is still possible to obtain desired accuracies of checking the contours of the cams 14 under test of one hundred thousandths of an inch. In fact, in actual practice, applicants have found that they are able to take a camshaft of the same type as the one they propose to check but which might even be a scrap shaft and use a section of this camshaft to provide the master cam C.

The recording unit G comprises generally a recording pen 45, a long paper tape 46 which moves on a longitudinal axis underneath the pen 45 and a driving drum 47 over which the tape 46 extends. The tape 46 has a plurality of equally spaced holes 46a along each edge which are engaged by spaced pins 47a on the surface of the drum.

The drum 47 is supported on a shaft 49 rotatably supported in its left end in a bearing 50 and on its right end extending into an aperture 51 on the left-hand end of the shaft 28, the shaft 28 being in effect an extension of the master camshaft 30. A clamping screw 53 rigidly locks the shaft 28 and the shaft 49 together. As shown, these two shafts are in actual alignment.

The drum 47 rotates with the master camshaft 30 and the indexing disk 22, thus advancing the paper tape 46 longitudinally relative to the recording pen 45. The linear movement of the tape corresponds to the angular movement of the master cam C and, as the camshaft B is locked to the master cam C, to the movement of this camshaft B also. During preliminary adjustment periods, the clamping screw 53 may be loosened whereby the indexing disk may be moved and the camshaft 30 rotated without advancing the paper tape 46 relative to the recording pen 45.

The diameter of the drum 47 may be made as desired. It will be appreciated that the greater its diameter, the greater will be the length of the tape 46 required for one complete revolution of the master camshaft 30. The drum 47 can, of course, be made quite small and driven from the shaft 49 through suitable gear trains but as it is difficult to eliminate backlash in gears, the direct drive is preferred and sometimes essential.

The comparator assembly E comprises a pair of cam follower assemblies 55, 56 each supported on a movement large-diameter shaft 57, which shaft is pivotally supported on an axis parallel to and, in the embodiment shown, slightly raised above the axis of rotation of the camshaft B and the master camshaft C.

The shaft 57 is rotatably supported relative to the base A by a pair of spaced bearing members 58, 59 which may be of conventional but preferably of the antifriction type such as roller bearings and the like. The shaft 57 is preferably of a substantial diameter to give rigidity to the entire structure. Its principal function is to support the follower assemblies 55, 56 in rigid and unbending relationship such that as the follower assembly 55 is raised or lowered, the follower assembly 56 will accurately and precisely follow its movement.

The cam follower assemblies 55, 56 are substantially identical and a description of the cam follower assembly 56 should suffice to explain the preferred construction of both of such assemblies.

The assembly 56 comprises a sleeve 62 for supporting the assembly relative to the shaft 57, a follower head 63 positioned forwardly of the sleeve 62 and a counterbalance 64 positioned rearwardly of the sleeve 62. An arm 65 of considerable length rigidly supports the follower head 63 relative to the sleeve 62.

The follower head 63 comprises a sleeve or squib 67 vertically adjustable relative to a flange 68 on the end of the arm 65 by means of an adjusting screw 69. The squib 67 is hollow and a follower arm 70 is slidably mounted therein and extends therethrough. The arm is adjustably positioned by nuts 71, 72 threaded thereon at the upper and lower ends respectively. These nuts 71, 72 may be tightened to bear against the ends of the squib 67 and lock the follower arms 70 within the squib. Alternatively, they may be loosened, whereby the arm 70 may oscillate slightly within the squib 67. The lower end of the follower arm 70 has a cam-follower roller 72 rotatably supported in a slot and extending below the end. The accuracy of the concentricity of this roller should be held within narrow limits.

The counterweight 64 is supported on the side of the sleeve 62 opposite from the follower head 63 by a threaded shaft 75. The purpose of the counterweights 64 is to counterbalance the weight of the follower assemblies 55, 56 so that the amount of pressure which the cam-follower roller 72 brings to bear on its respective cam may be controlled.

The follower assembly 55 is preferably movable along the shaft 57 so that various cams to be tested may be engaged by the cam-follower roller 62. In a like manner, the follower assembly 56 is movable along the shaft 57 so that a plurality of master cams C may be engaged by its cam-follower roller. To facilitate the moving of these follower assemblies along the shaft 57, a rack-and-pinion arrangement is provided, a rack 60 extending along the entire upper edge of the shaft 57 and a pinion being mounted internally of the sleeve 62 and rotated by a handle 77 which extends forwardly of the sleeve 62.

Means are also provided for rigidly clamping the sleeve 62 to the shaft 67, such means being shown in the form of a set screw 78 which are threadably engaged in the wall of the sleeve 62 and may be engaged with the outer surface of the shaft 67.

It will be appreciated that when the set screws 78 are tightened down, each follower assembly becomes rigid relative to the shaft 57 and, therefore, rigid to each other.

In normal operation, the follower arm 70 in the cam follower assembly 55 is locked tight within the squib 67 by the lock nuts 71, 72. On the contrary, however, the follower arm 70 in the follower assembly 56 is freely movable within the squib 67.

As the master camshaft 30 and the camshaft B under test are rotated about their axes, it will be appreciated that the cam 14 will cause its follower assembly to pivot about the axis of the shaft 57 in exact proportion to the amount of rise of the cam itself.

If there are any differences in the contour of the cam C and the cam 14, such differences will manifest themselves in a movement of the cam follower arm 70 relative to its squib 67. It is this difference in movement, which is the critical difference, which it is desired to measure.

For the purpose of measuring or indicating this difference, the preferred embodiment employs an electronic-type amplifier. Such instruments are conventional in the art and will not be explained to great detail. Suffice it to say, for the purposes of this description, such apparatus generally includes a pick-up head 80 which, in the embodiment shown, is mounted on the front end of the arm 65 by means of a suitable bracket 81. The pick-up head 80 has a follower arm 82, the lower end of which engages the upper end of the cam follower arm 70 and moves in accordance with the movement of the cam follower arm 70 in relation to the movement of the squib 67, which squib in operation is rigidly fixed to the end of the arm 65. The movement of the pick-up head arm 82 in relation to the bracket 81 is converted in the pick-up head 80 to an electrical unbalance which is then fed to the electronic amplifier F through a suitable wire 83 and there amplified. The amplified electronic impulse is then fed to the electronic amplifier through a suitable wire 84 to a sensitive microammeter 85, the end of the arm of which microammeter is the recording pen 45. As shown, the microammeter 85 is supported in position relative to the tape 46 by a suitable bracket 87. Also, a direct reading microammeter 90 may be employed. The meters 85 and 90 are calibrated to read directly in any desired range such as —.001 inch, —.0001 inch more or less.

The electronic amplifier F preferably has what may be termed as a centering control 88, the function of which is to adjust the position of the recording pen 45 to a central position during the preliminary adjustment period.

Figures 4, 5:
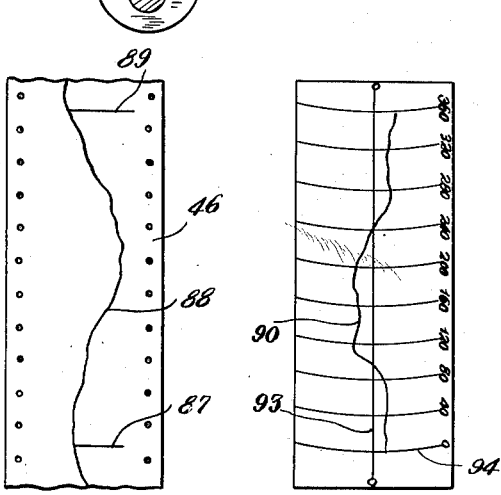
Figure 4 shows a length of a paper tape with a central longitudinally-extending line illustrating a typical cam contour curve.
Figure 5 is a view similar to Figure 4 and to the same scale but showing a graph of the variation of the master cam from the ideal or perfect cam.

In operation, the master cam C and the cam under test 14 are accurately lined up so that the cam follower roller 70 on each cam follower assembly is in engagement with the identical or corresponding portions of the cams. The indexing head is turned to any desired starting or reference point such as 0° or 180°. The set screw 53 is tightened down to insure a positive drive between the indexing head shaft 28 and the drum 47. With the indexing head set at the proper point, if the pick-up head arm 82 is lifted manually, the recording pen 45 will move radially to one side making a line 87 on the chart as shown in Figure 4. The indexing head is then slowly rotated through one entire revolution. As the indexing head is rotated, the cam follower assembly 55 rides up and down in accordance with the contour of the cam under test. As the cam follower assembly 55 moves up and down, the cam follower assembly 56 does the same. Any differences in the contour of the two cams are taken up by a relative movement of the cam follower arm 70 in the assembly 56. This movement in turn is transmitted to the pick-up arm 82 and is amplified by the electronic amplifier F and, in turn, converted to mechanical movement by the microammeter 85. The recording pen 45 swings to the right and left accurately indicating the amount of deviation between the two cams by a line 88 when the cams have been moved through one complete revolution, the deviation being accurately shown in relation to the angular position. The pick-up arm 82 is again lifted manually making a second mark transverse to the length of the tape 89. The space between the marks 87 and 89 represents, on a linear base, 360 degrees angular movement of both the master cam and the cam 14 under test.

The amount of actual transverse swing of the recording pen 45 will depend primarily on the amount of deviation or variation between the master cam and the cam 14 and, secondarily, on the amount of amplification of this deviation or variation by the electronic amplifier. The amplification may be any amount desired within the capabilities of the electronic amplifier. Amplifications on the order of one million times are possible.

As previously stated, the master cam C is not in the true sense of the word a master cam but can actually be a production-type cam of the same type as the one under test. It becomes a master cam simply by virtue of the fact that it has been placed in highly accurate laboratory equipment and its exact contour determined or in other words its exact variation from the ideal or perfect cam determined, the ideal or perfect cam being the one specified by the purchaser of the cam itself.

The variation of the master cam from the ideal cam is then amplified or multiplied by the exact amplification of the electronic amplifier and this amplified deviation is plotted against a linear representation of the angular position of the cam preferably on a celluloid or other transparent member 91. A typical curve is indicated by the numeral 90 in Figure 5. The beginnings and ends of this curve preferably correspond to the exact beginning and end points of the marks 87 and 89. Stated otherwise, the points 87, 89 are chosen to correspond with the end points of the master cam deviation curve. This deviation graph on the transparent member 91 is preferably plotted about a central zero axis 93 as shown and it is also preferred that the space between the ends of the plotted curved be divided into degrees with curved lines 94 substantially as shown, the curve of the lines being corresponding to the curvature of the swing of the recording pen 45.

Figure 6:
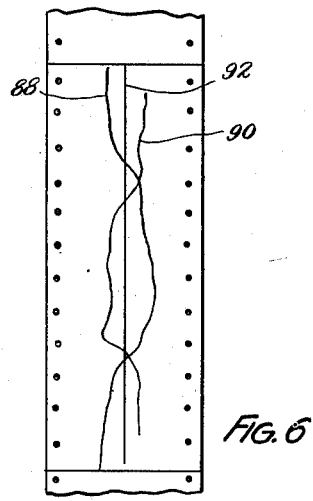
Figure 6 is a view of Figure 4 with an overlay of the view shown in Figure 5 and including an additional curve showing the final curve representing variation of the cam under measurement from the ideal or perfect cam.

To determine the deviation of the cam 14 from the perfect or ideal cam, the transparent graph shown in Figure 5 is overlayed on the tape of Figure 4 substantially as shown in Figure 6 and the deviation of the two curves about the zero axis added algebraically and a final deviation curve 92 plotted.

In setting the machine up for operation, it is necessary to determine the exact relationship of the indexing head D in relation to the master cam. In some cams, this is difficult because there is no accurate indexing point. Generally, one half of the cam itself is the base circle of the cam and there is no deviation over this portion. Many times the high point of the cam has a substantial dwell thereon.

Assuming for the purposes of illustration that the master cam has a maximum dwell of six degrees at its lobe, in order to find the center of this dwell accurately, points are arbitrarily chosen on either side of the dwell as a reference point; for example, ten degrees. Reference is then made to the perfect cam contour to determine the actual deviation in the rise of the cam at the two selected points, if there be such deviation. Reference is then made to the master cam chart to determine its deviation from the perfect cam at these same points and this deviation is added to the deviation of the perfect cam. The master cam is set relative to the index head D approximately at what is thought to be the proper position. The index head is then moved to one of the selected portions and the zero adjustment 88 on the electronic amplifier varied until an indicating hand on the indicator 90 indicates zero. The indexing head is then moved to the other selecting point and the indicating instrument read to determine whether the deviation corresponds to the computed value. If not, the set screw 29 is loosened and the indexing disk 22 is adjusted relative to the master cam C and the procedure repeated. During this operation, the cam follower assembly 55 is blocked out so that it is not in contact with the cam 14 and cannot itself move.

After the master cam has been accurately locked relative to the indexing mechanism D, the cam 14 under test must be accurately located relative to the master cam. The cam 14 is rotated to approximately what is considered to be the proper position relative to the master cam C. The clamp 40 with its arm 41 extending between the micrometer screws 36, 37 is then fastened tightly on to the flange 13 of the camshaft. A procedure similar to that for aligning the master cam relative to the indexing head is followed, the adjustments being effected using the micrometer screws 36, 37, adjustment of which obviously angularly positions the cam 14 relative to the master cam C.

Once the two cams have been aligned, the indexing head may be rotated through an angle of 360 degrees taking with it the master cam and the cam 14 as well as the recording drum 47. A trace such as that shown in Figure 4 is obtained.

It will be appreciated that other types of camshafts may require other procedures for aligning. Some cams have a very definite high spot. Some camshafts have reference points on the shaft itself and all other points on the cam themselves must be located relative to this reference point.

It will be appreciated that as the width of the paper tape 46 is increased, the total range of deviation of the apparatus may be increased almost without limit. Also, dependent on the diameter of the drum 47 or upon some gear ratio between the shaft 23 and the drum 47, the length of the tape 46 for a 360-degree revolution of the indexing head may be readily controlled.

Figure 7:
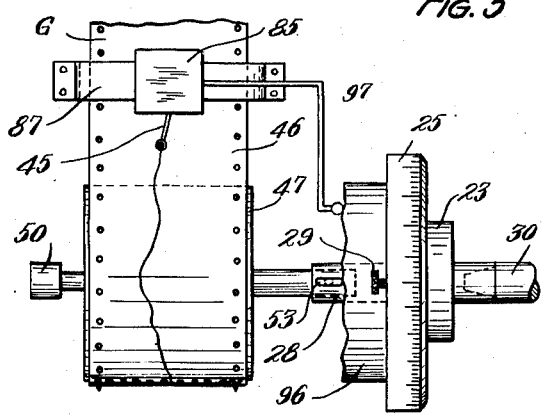
Figure 7 is an alternative arrangement of the apparatus shown in Figure 1 but including provision for means whereby the tape recorder will show directly the actual variation of the cam being measured from the ideal or perfect cam.

Referring now to Figure 7 wherein there is shown a modification of the apparatus shown in Figures 1 and 2, the purpose of this apparatus is to eliminate the necessity for the manual algebraic adding of the test curves on the tape of Figure 4 and the master curve on the celluloid of Figure 5 and to obtain a direct reading of the deviation of the cam 14 under test in relation to the perfect or ideal cam. In this embodiment of the invention, a cam 96 of the amplified deviation of the master cam from the ideal is prepared. This cam may take a number of different forms but in the embodiment shown, comprises a long sheet of material having one edge with a deviation of the master cam formed thereon. This long sheet of material is formed into a circle and placed on the side of the indexing disk 22 with the deviation curve of the master cam facing to the left as shown in Figure 7. The microammeter 85' is movably supported on a flat surface so that it can move transversely to the length of the tape 46. A follower arm 97 extends between the microammeter 85' and the circular cam such that as the indexing disk 22 is rotated, the microammeter 85' is moved transversely relative to the length of the tape 46, thus automatically algebraically adding the deviations of the master cam to the swing of the recording pen 45. The operation otherwise is identical to the operation of the first described embodiment.

The only difference is that the chart shown in Figures 5 and 6 need not be prepared. The tape shown in Figure 4 is the only and the final curve which must be drawn.

It will be appreciated that the apparatus described is the prefered embodiment and is subject to many modifications. For example, the cam follower assemblies may reciprocate in guideways rather than pivoting about an axis. Mechanical linkages can be provided between the master cam C and the recording pen on the tape. Such linkages, however, are normally undesirable due to problems of backlash, temperature distortion and the like.

The above described embodiments are illustrative of the invention only. It is obvious the invention is applicable in other situations and the embodiment subject to many modifications which will occur to those skilled in the art upon a reading and understanding of this specification. It is our intention to include all such modifications insofar as they come within the scope of the appended claims.

Having thus described our invention, we claim:

1. Apparatus of the type described, comprising, in combination, a base, a master camshaft rotatably supported on said base and having a master cam, said master cam differing from a perfect cam by an immaterial but predeterminable amount, a recording tape and a rotatable drum for driving said tape mechanically connected and axially aligned with said master camshaft, said base including means for rotatably supporting a camshaft having cams to be tested in axial alignment with said master camshaft and said drum, means adapted to rigidly fix a camshaft having cams to be tested relative to said master camshaft and said drum, a comparator assembly comprising a follower head for said master cam and a follower head adapted to engage the cam to be tested, one of said follower heads moving said assembly in response to the rise and fall of one of said cams, the other follower head including a member freely movable therein and resting on the other of said cams, apparatus for detecting any movement between said member and its follower head as said cams are rotated on said common axis and for amplifying said movement, means including a recording pen for tracing said amplified movement on said recording tape.

2. Apparatus of the type described, comprising, in combination, a base, a master cam rotatably supported on said base, said master cam differing from a perfect cam by an immaterial but predetermined amount, recording means including a rotatable member mechanically connected to and axially aligned with said master cam for rotation with said master cam on a common axis, said base including means for rotatably supporting a camshaft having cams to be tested in axial alignment with said master cam and said rotatable member, means adapted to rigidly fix said camshaft to said master cam whereby a camshaft to be tested and said master cam and rotatable member can be rotated as a rigid unit, a comparator assembly comprising a follower head for said master cam and a follower head adapted to engage the cam on said camshaft to be tested, one of said follower heads moving said assembly in response to the rise and fall of one of said cams, the other follower head including a member freely movable on a line through said axis and resting on the other of said cams, apparatus associated with said other follower head and said member for detecting any movement between said member and its follower head as said cams are rotated, said apparatus including means for amplifying said movement, recording means associated with said apparatus and said rotatable member for marking said amplified movements on said rotatable member.

3. In apparatus of the type described, a base, a master cam and a drum member rotatably supported on said base on a common axis, means on said base for rotatably supporting a camshaft in axial alignment with said master cam and drum, a comparator assembly including a pair of relatively movable members, one engaging the master cam and the other adapted to engage a cam to be checked, apparatus associated with said members sensitive to minute relative movements therebetween, amplifying apparatus associated with said movement, amplifying apparatus amplifying said movement a predetermined amount and including a tracer associated with said drum for tracing said amplified differences thereon, a cam member having a contour corresponding to the differences of said master cam from a perfect cam, said cam being movable with said master cam when it is rotated and being operatively associated with said tracer for introducing said amplified master cam differences into said tracer whereby to compensate for said differences and obtaining direct reading of the differences of the cam under test from a perfect cam.

4. The combination of claim 1 wherein means adapted to rigidly fix the camshaft under test to the master cam, including adjusting means to facilitate the alignment of the cam under test with the master cam.

GEORGE C. NEBESAR.
ROBERT N. CUMMER.

REFERENCES CITED

The following references are of record in the file of this patent:

UNITED STATES PATENTS

| Number | Name | Date |
| --- | --- | --- |
| Re. 22,953 | Praeg | Dec. 23, 1947 |
| 1,652,435 | Goodrich | Dec. 13, 1927 |
| 2,111,815 | Schwartz | Mar. 22, 1938 |
| 2,313,133 | Ernst | Mar. 9, 1943 |

FOREIGN PATENTS

| Number | Country | Date |
| --- | --- | --- |
| 584,737 | England | Jan. 22, 1947 |
| 591,197 | England | Aug. 11, 1947 |